L. A. GRIMES.
PIPE HANGER.
APPLICATION FILED JULY 7, 1915.
1,169,635.
Patented Jan. 25, 1916.
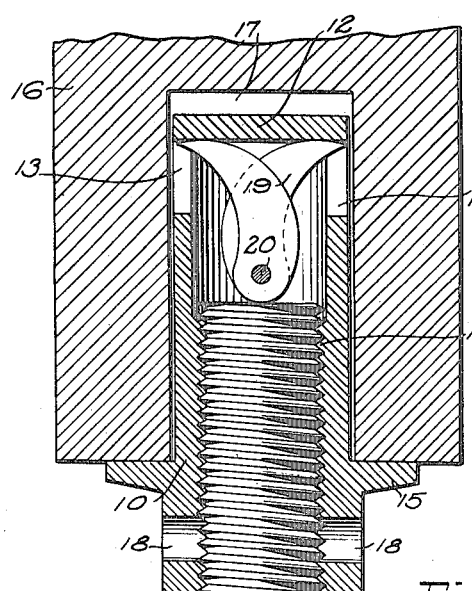
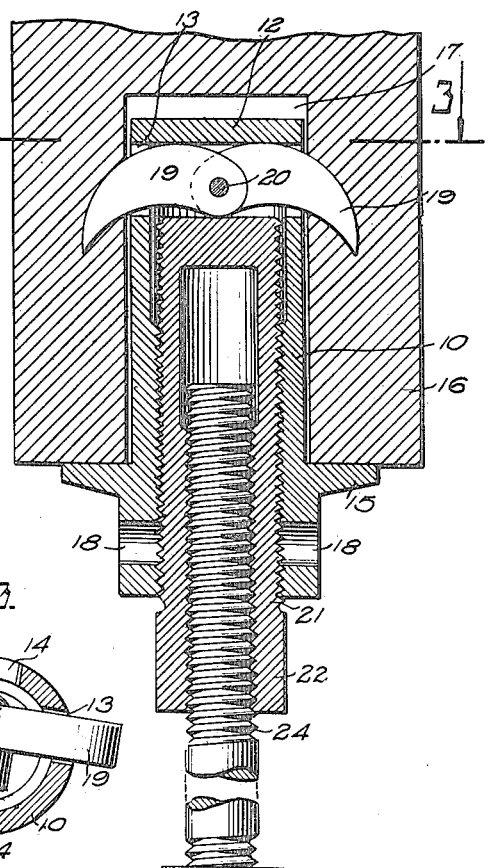
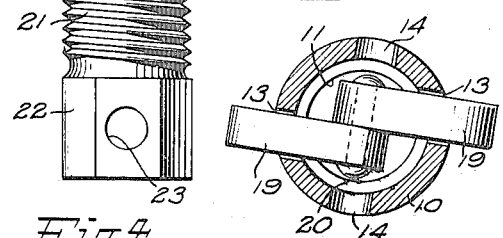
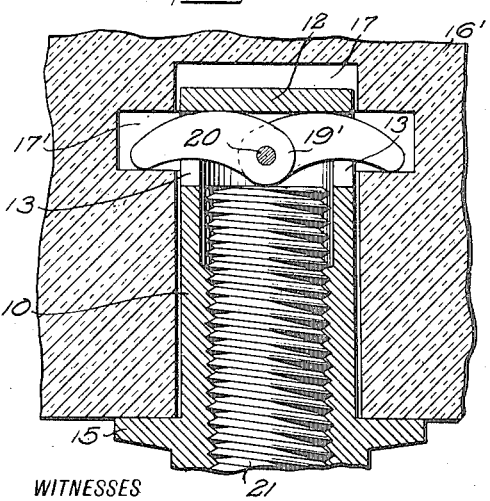
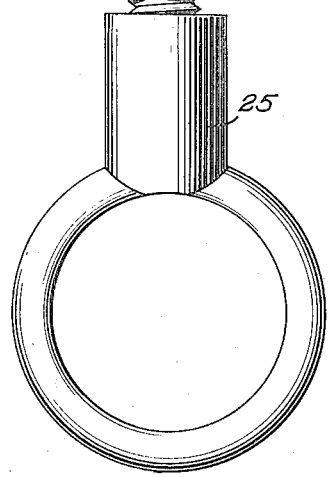
WITNESSES
George L. Blume.
Geo. L. Beeler.
INVENTOR
L. A. Grimes
BY Munn & Co
ATTORNEYS

UNITED STATES PATENT OFFICE.

LESTER A. GRIMES, OF ORANGE, NEW JERSEY.

PIPE-HANGER.

1,169,635.　　　　　Specification of Letters Patent.　　Patented Jan. 25, 1916.

Application filed July 7, 1915. Serial No. 38,410.

*To all whom it may concern:*

Be it known that I, LESTER A. GRIMES, a citizen of the United States, and a resident of Orange, in the county of Essex and State of New Jersey, have invented a new and Improved Pipe-Hanger, of which the following is a full, clear, and exact description.

This invention relates to pipe hangers and has particular reference to devices designed particularly for supporting pipes for automatic sprinkling systems in buildings. Obviously, however, the hanger means may be employed for supporting other devices than water pipes.

Among the principal objects aimed at in the present improvement is to provide an anchoring means adapted to be readily and easily applied to floor beams or joists in a positive and secure manner.

Another object of the invention is to provide a means for easy and effective inspection, whereby the inspector may determine whether the work of installation has been properly performed.

A further object of the invention is to provide means for determining the effective length of the immediate pipe support so that the water pipes or the like may be accurately elevated.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a vertical sectional view of the anchor means in the process of assemblage or positioning, the parts being in section; Fig. 2 is a similar view showing the position of the parts when anchored; Fig. 3 is a transverse section on the line 3—3 of Fig. 2, showing the relation of the claws to each other and to the sleeve portion of the anchor; and Fig. 4 is a view corresponding substantially to Fig. 2, but showing a modification of the device adapted for connection to a concrete structure.

Referring more particularly to the drawings, I show an anchoring device comprising a sleeve 10 principally of cylindrical form having an internal bore provided as shown herein with a left handed screw thread 11 but having a rigid closed upper end 12. Adjacent said end 12 are formed opposite side openings 13, the axes of which, however, are arranged parallel to each other on opposite sides of the center of the sleeve as shown in Fig. 3. Other holes are formed through the wall of the shell as shown at 14 with their axes perpendicular to the axes of the openings 13. The lower or open end of the shell is enlarged somewhat and provided with a horizontal flange 15 adapted to be applied squarely against the lower edge of the joist or beam 16 in which a hole or socket 17 is formed to receive the sleeve 10. This member 16 will be understood as being of wood or its equivalent for the application of the device shown in the main figures. The lower or head end portion of the sleeve is preferably provided with sight holes 18 with their axes in the same vertical plane as the openings 13.

A pair of claws 19 are provided for application to the upper end of the sleeve and adapted to project through the openings 13 for engagement with the structure of the beam 16. These claws are shown pivoted together by means of a pivot 20 adapted to be introduced into place through one or the other of the holes 14. The claws are unattached to the sleeve and are so formed as to be held by their points from dropping freely downwardly along the sleeve. They are caused by contact with the under surface of the top 12 to be forced outward and downward into engagement with the beam 16. The several claws or prongs being pivoted together alongside of each other are adapted to project through the openings 13 which may be described as being tangential with respect to the center of the sleeve, whereby the least amount of material of the sleeve is cut away proportional to the maximum strength of the parts.

At 21 I provide a plunger screw threaded at its outer surface to conform to the thread 11 of the sleeve and having a polygonal head 22 at its lower end for manipulating it into or out of the sleeve. When turned upwardly toward the head or disk 12, the upper end of the plunger impinges against the jointed overlapping ends of the prongs causing the prongs to be forced upwardly and outwardly as above described and serving to hold the same in such position. The head 22 also is preferably provided with one or more sight openings 23 on the sides. The plunger is hollow and provided with an internal screw thread adapted to receive a shank 24 to the lower end of which is connected a stirrup 25 of any suitable nature to support the pipe or other device (not shown). While the thread 11 is shown as left handed with a corresponding thread on the outside of the plunger, it is obvious that a right hand thread may be employed instead, but for certain purposes as for delicacy of fine adjustment, the left hand thread is preferable. Likewise the shank 24 may have right and left threads, but as shown, both threads are right hand. The threaded parts may be used as an ordinary turnbuckle so as to properly aline the device after being hung, or for making the connection of the same to the anchoring devices after they are put in place.

The purpose of the sight openings 18 is to enable the inspector to be satisfied that the sleeve is so positioned that the prongs 19 are caused to engage transversely of the grain of the wood of the beam. The purpose of the sight holes 23 in the head of the plunger is to satisfy the inspector that a sufficient portion of the shank 24 is in threaded engagement with the plunger to satisfy the building regulations.

The arrangement shown in Fig. 4 is similar in all essentials to that previously set forth, but in this figure there is indicated at 16' a concrete structure drilled at 17 and counterbored by any suitable means at 17' to receive the points of the prongs 19' where they bear on the shelf formed at the bottom of the counterbore 17'. In this, as in the other form of the invention, the cam or curved portions of the prongs bear upwardly against the disk end 12 of the sleeve, the reaction of which, due to the action of the plunger, serves to seat the flange 15 of the sleeve firmly against the bottom of the beam or supporting structure.

I claim:—

1. The herein described pipe hanger comprising a sleeve having oppositely arranged openings adjacent one end and having a central screw threaded bore, said end of the sleeve being closed, a pair of prongs mounted loosely within the opening of the sleeve and pivoted permanently together at their inner ends but adapted to project outwardly through said openings, and a plunger acting upwardly in the sleeve against the pivoted ends of the prongs to cause the points thereof to project outwardly forcibly into holding position and serving by reaction against said closed end of the sleeve to lock the prongs and the sleeve in place.

2. In a pipe hanger, the combination of a hollow internally threaded sleeve having a closed end and side openings adjacent said end, said sleeve also having at its opposite end a horizontally projecting flange, a pair of claws mounted loosely within the sleeve and pivoted permanently together, a plunger having threaded engagement with the inner portion of the sleeve bearing at its upper end against the pivoted ends of the prongs whereby the points of the prongs are forcibly projected outwardly in opposite directions through said sleeve openings, and hanger means adjustably connected to said plunger.

3. In a pipe hanger, the combination of a hollow sleeve having a closed upper end adjacent which are formed oppositely arranged side openings, said sleeve having at its opposite end a horizontally projecting flange adjacent which is provided a sight opening in the same vertical plane as the openings first mentioned, a pair of prongs located within the sleeve and pivoted together at their adjacent ends but bearing upwardly against said closed end of the sleeve, a plunger movable upwardly into the interior of the sleeve against the pivoted ends of the prongs causing the same to be projected forcibly outwardly through said first mentioned openings causing said flange to be drawn firmly against the supported structure, and pipe supporting means extending into the lower end of the plunger and adjustable as to length with respect thereto, said plunger being provided with a sight opening to indicate that proper connection is made between it and the hanger means.

LESTER A. GRIMES.

Witnesses:
Geo. L. Beeler,
George H. Emslie.